US007720092B1

(12) United States Patent
Sindhu et al.

(10) Patent No.: US 7,720,092 B1
(45) Date of Patent: May 18, 2010

(54) HIERARCHICAL ROUND ROBIN ARBITER

(75) Inventors: Pradeep Sindhu, Los Altos Hills, CA (US); Debashis Basu, San Jose, CA (US); Edwin Su, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 329 days.

(21) Appl. No.: 11/755,984

(22) Filed: May 31, 2007

Related U.S. Application Data

(63) Continuation of application No. 10/206,997, filed on Jul. 30, 2002, now Pat. No. 7,239,646.

(60) Provisional application No. 60/348,618, filed on Jan. 17, 2002.

(51) Int. Cl.
*H04J 3/02* (2006.01)
(52) U.S. Cl. .................. 370/462; 370/235; 370/419; 370/416
(58) Field of Classification Search .................. None
See application file for complete search history.

(56) References Cited

U.S. PATENT DOCUMENTS

| | | | | |
|---|---|---|---|---|
| 5,544,160 A * | 8/1996 | Cloonan et al. | .......... | 370/395.1 |
| 5,835,491 A | 11/1998 | Davis et al. | .................. | 370/386 |
| 5,883,895 A | 3/1999 | Davis et al. | .................. | 370/462 |
| 5,912,889 A | 6/1999 | Preas et al. | .................. | 370/359 |
| 5,949,789 A | 9/1999 | Davis et al. | .................. | 370/452 |
| 5,956,342 A * | 9/1999 | Manning et al. | ............ | 370/414 |
| 6,032,218 A | 2/2000 | Lewin et al. | ................. | 710/240 |
| 6,044,061 A | 3/2000 | Aybay et al. | ................. | 370/230 |
| 6,160,812 A | 12/2000 | Bauman et al. | ............. | 370/416 |
| 6,185,221 B1 * | 2/2001 | Aybay | ......................... | 370/412 |
| 6,539,025 B1 * | 3/2003 | Manning et al. | ............ | 370/414 |
| 6,661,788 B2 * | 12/2003 | Angle et al. | ................. | 370/390 |

* cited by examiner

*Primary Examiner*—Bob A Phunkulh
(74) *Attorney, Agent, or Firm*—Harrity & Harrity, LLP

(57) ABSTRACT

A hierarchical round robin arbiter includes a first set of arbitration vectors, each associated with a plurality of requesters. A second arbitration vector includes one bit for each arbitration vector in the first set. The single bit informs the round robin arbiter if any of the requesters associated with the corresponding arbitration vector in the first set are requesting service. The round robin arbiter can determine whether one of a number of requesters is requesting service by examining the single bit in the arbitration vector.

17 Claims, 7 Drawing Sheets

HIERARCHICAL ROUND ROBIN ARBITER

RELATED APPLICATIONS

This application is a continuation of U.S. patent application Ser. No. 10/206,997, filed Jul. 30, 2002, now U.S. Pat. No. 7,239,646 which claims priority under 35 U.S.C. §119 based on U.S. Provisional Application No. 60/348,618, filed Jan. 17, 2002, the disclosures of which are incorporated herein by reference.

BACKGROUND OF THE INVENTION

A. Field of the Invention

The present invention relates generally to arbitration, and more particularly, to a high-speed round robin arbitration scheme.

B. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was enabled.

To meet the new demands, purpose-built routers were designed. Purpose-built routers are designed and built with components optimized for routing. They not only handle higher line rates and higher network traffic volume, they also add functionality without compromising line rate performance.

A purpose-built router may include a number of input and output ports from which it transmits and receives information packets. A switching fabric may be implemented in the router to carry the packets between ports.

One function that may be implemented within a purpose-built router is the arbitration of data as it passes through various components of the router. For example, information packets from a number of different sources may be temporarily stored in a corresponding number of queues. The packets in the queues may be chosen for processing in an order determined by an arbiter, such as a round robin arbiter.

Conventionally, round robin arbiters operate by sequentially cycling through each possible requester, such as the requesting queues, and checking whether the active requester in the cycle has data to be serviced. Queues that are not active may be skipped by the round robin arbiter. If so, the round robin arbiter initiates service on the active requester. In the situation given above, for example, in which a round robin arbiter arbitrates among multiple queues, if an active queue has a packet ready to be serviced, the round robin arbiter may initiate reading the packet from the active queue. In this manner, because the round robin arbiter sequentially cycles through each requester, the round robin arbiter gives equal priority to each requester.

Purpose-built routers may have high data throughput rates, thus requiring high performance arbiters. Conventionally, as the number of possible requesters increases, the complexity of conventional implementations of an arbiter such as a round robin arbiter also increases. In some cases, the round robin arbiter may not be able to keep up with the requesters.

Accordingly, there is a need in the art to implement an efficient round robin arbiter that is able to operate at high throughput rates.

SUMMARY OF THE INVENTION

A hierarchical round robin arbiter represents potential requesters as a hierarchical arrangement of arbitration vectors. The hierarchical arrangement allows the round robin arbiter to quickly determine whether any requesters represented by the corresponding arbitration vector are requesting service.

One aspect of the present invention is directed to a method including providing a plurality of bits in arbitration vectors of a multi-vector arrangement, the bits having set values based on requests for service associated with a number of devices; aggregating the plurality of bits into a single bit for each of the arbitration vectors; determining, from the single bit, whether a request for service is pending for one of the devices; and selecting, as part of an arbitration scheme, the one device for servicing when the request for service is pending.

Another aspect of the present invention is directed to an arbitrator including an array of arbitration vectors, each arbitration vector including a group of first bits, each first bit corresponding to request information for each of a number of devices; an aggregate arbitration vector including a plurality of second bits, each second bit corresponding to one of the arbitration vectors; a circuit associated with each arbitration vector-second bit pair to set values for the second bits when a first bit in the arbitration vectors of the arbitration vector-second bit pairs indicates that request information is pending for the corresponding devices; and an arbitration component to arbitrate among the plurality of devices based on the values in the aggregate arbitration vector.

Yet another aspect of the present invention is directed to an arbitration system including means for providing a plurality of bits in arbitration vectors of a multi-vector arrangement, wherein the bits are to be set to indicate requests for service associated with a number of devices; means for aggregating the plurality of bits into a single bit for each of the arbitration vectors; means for determining, from the single bit, whether a request for service is pending for one of the devices; and means for selecting, as part of an arbitration scheme, the one device for servicing when the request for service is pending.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, in one implementation, a hierarchical round robin arbiter operates on multiple arbitration vectors. Each arbitration vector is first reduced to a single bit by a logically ORing the bits of the vector. By examining the bit corresponding to the vectors, the round robin arbiter can quickly determine which vectors have requesters requesting service.

SYSTEM DESCRIPTION

Figure 1:
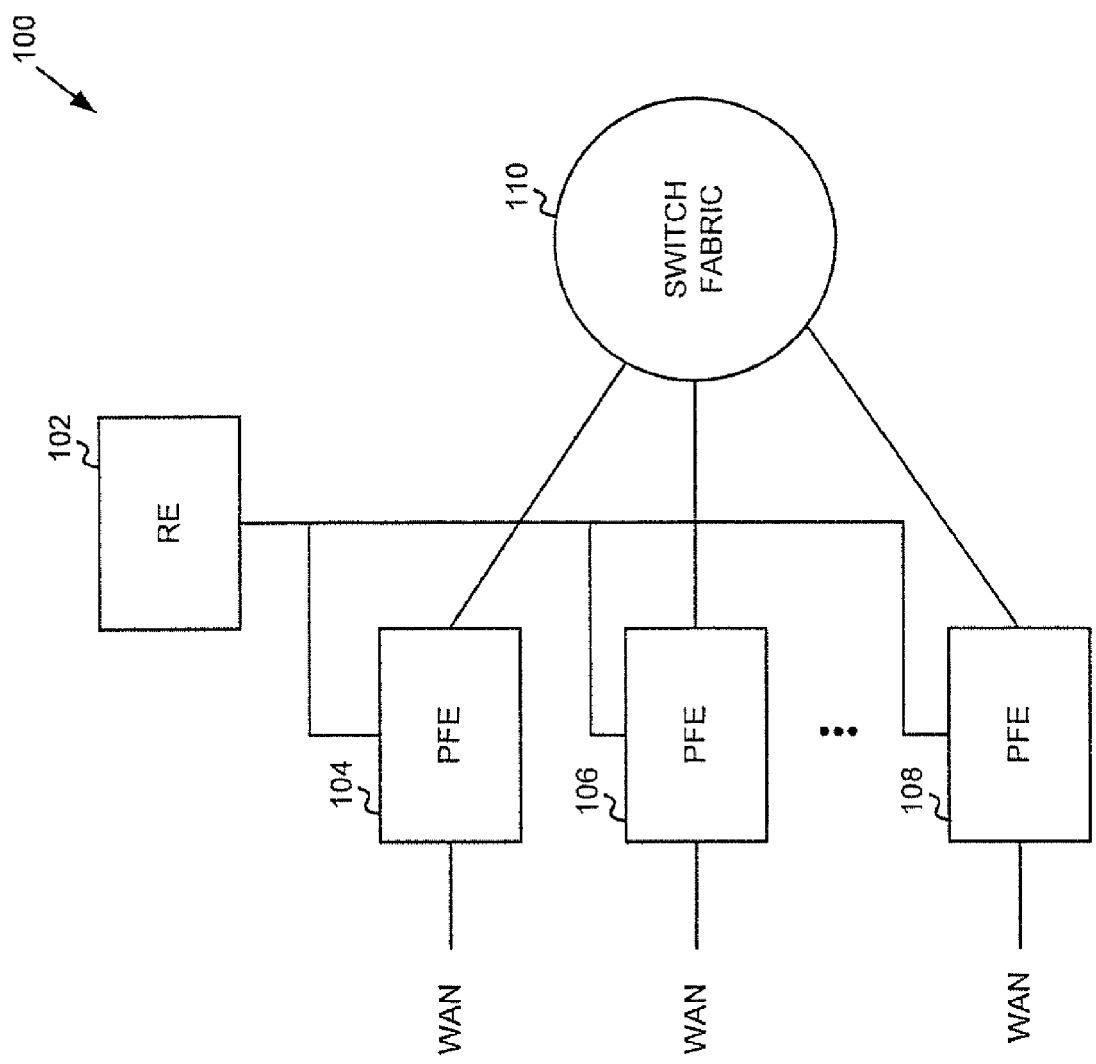
FIG. 1 is a block diagram illustrating an exemplary routing system in which systems and methods consistent with the principles of the invention may be implemented.

FIG. 1 is a block diagram illustrating an exemplary routing system 100 in which principles consistent with the invention may be implemented. System 100 comprises packet forwarding engines (PFEs) 104, 106 . . . 108, a switch fabric 110, and a routing engine (RE) 102. System 100 receives a data stream from a physical link, processes the data stream to determine destination information, and transmits the data stream out on a link in accordance with the destination information.

RE 102 performs high level management functions for system 100. For example, RE 102 communicates with other networks and systems connected to system 100 to exchange information regarding network topology. RE 102 creates routing tables based on network topology information and creates forwarding tables based on the routing tables and forwards the forwarding tables to PFEs 104, 106, and 108. The PFEs use the forwarding tables to perform route lookup for incoming packets. RE 102 also performs other general control and monitoring functions for system 100.

PFEs 104, 106, and 108 are each connected to RE 102 and switch fabric 110. PFEs 104, 106, and 108 receive data at ports on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

PFE 104 will be used to discuss the operations performed by PFEs 104, 106, and 108 consistent with the principles of the invention. PFE 104 processes incoming data by stripping off the data link layer. PFE 104 converts header information from the remaining data into a data structure referred to as a notification.

For example, in one embodiment, the data remaining after the data link layer is stripped off is packet data. PFE 104 converts the layer 2 (L2) and layer 3 (L3) packet header information included with the packet data into a notification. PFE 104 stores the notification, some control information regarding the packet, and the packet data in a series of cells, where a cell is a unit of data having a fixed length (e.g., 64 bytes). In one embodiment, the notification and the control information are stored in the first two cells of the series of cells.

PFE 104 performs a route lookup using the notification and the forwarding table from RE 102 to determine destination information. PFE 104 may also further process the notification to perform protocol-specific functions, policing, and accounting, and might even modify the notification to form a new notification.

If the destination indicates that the packet should be sent out on a physical link connected to PFE 104, then PFE 104 retrieves the cells for the packet, converts the notification or new notification into header information, forms a packet using the packet data from the cells and the header information, and transmits the packet from the port associated with the physical link.

If the destination indicates that the packet should be sent to another PFE via switch fabric 110, then PFE 104 retrieves the cells for the packet, modifies the first two cells with the new notification and new control information, if necessary, and sends the cells to the other PFE via switch fabric 110. Before transmitting the cells over switch fabric 110, PFE 104 appends a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, RE 102, PFEs 104, 106, and 108, and switch fabric 110 perform routing based on packet-level processing. The PFEs store each packet using cells while performing a route lookup. A packet might be received on one PFE and go back out to the network on the same PFE, or be sent through switch fabric 110 to be sent out to the network on a different PFE.

Figure 2:
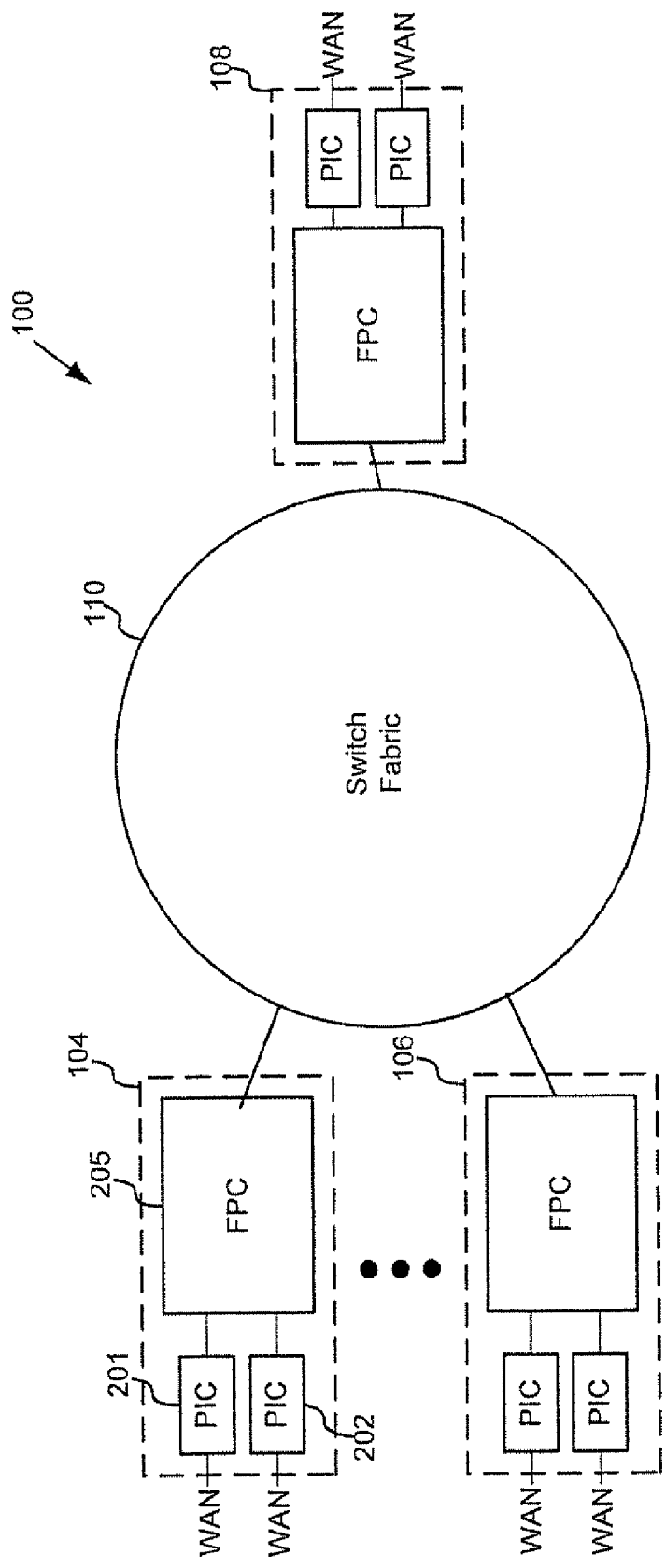
FIG. 2 is a detailed block diagram illustrating portions of the routing system shown in FIG. 1.

FIG. 2 is a detailed block diagram illustrating portions of routing system 100. PFEs 104, 106, and 108 connect to one another through switch fabric 110. Each of the PFEs may include one or more physical interface cards (PICs) 201-202 and flexible port concentrators (FPCs) 205.

PIC 201 transmits data between a WAN physical link and FPC 205. Different PICs are designed to handle different types of WAN physical links. For example, PIC 201 may be an interface for an optical link while PIC 202 may be an interface for an Ethernet link. Although FIG. 2 shows two PICs connected to the FPCs, in other implementations consistent with principles of the invention, there can be more or fewer PICs connected to an FPC.

Figure 3:
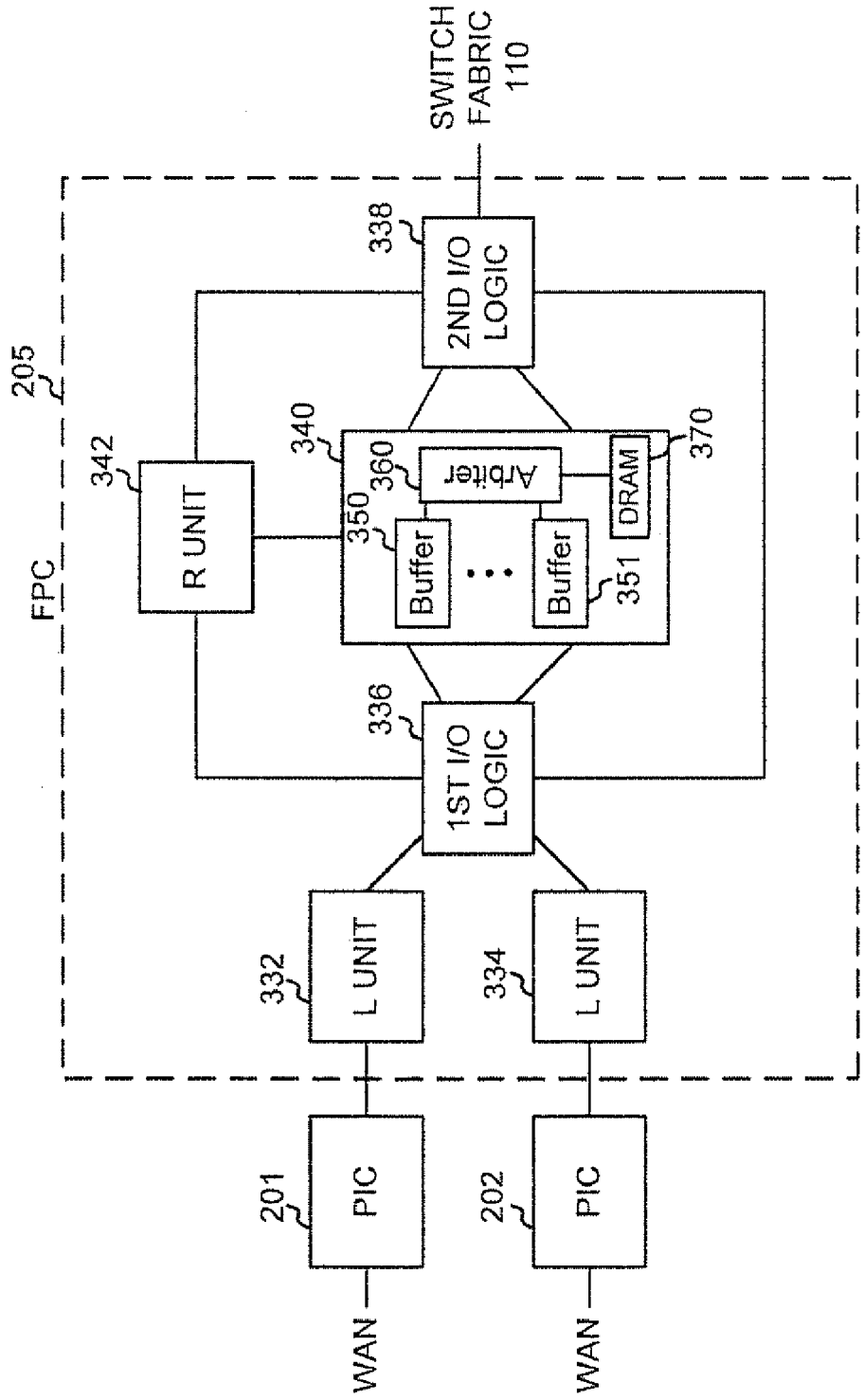
FIG. 3 is a diagram illustrating portions of FIG. 2 in additional detail.

FIG. 3 is a diagram illustrating FPC 205 in additional detail. FPC 205 may include L units 332 and 334, first input/output (I/O) logic 336, second input/output (I/O) logic 338, memory system 340, and R unit 342. Each of L units 332 and 334 corresponds to one of PICs 201 and 202. L units 332 and 334 may process packet data flowing between PICs 201 and 202, respectively, and first I/O logic 336. Each of L units 332 and 334 may operate in two modes: a first mode for processing packet data received from PIC 201 or 202 connected to it, and a second mode for processing packet data received from first I/O logic 336. In the first mode, L units 332 and 334 forward the packet data received from the PICs 201 and 202 as a series of cells to first I/O logic 236. In the second mode, L units 332 and 334 receive cells from first I/O logic 336, reconstruct the cells into packet data, and forward the packets to PICs 201 and 202. Second I/O logic 338 functions similarly to first I/O logic 336, but transfers cells between memory system 340 and switch fabric 110.

I/O logic 336 and 338, after receiving a series of cells may process the cells and insert the results of the processing into a notification. The processing results may include, for example, packet header information and, possibly, other packet-related information. For example, first I/O logic 336 and second I/O logic 338 may extract L2 and L3 header information from incoming cells and use the information to form a notification. The notification might include some of the original header information, processed header information, and/or other information regarding the packet. First I/O logic 336 and second I/O logic 338 may also create control information based on the packet. The control information may be based on the packet header, the packet data, or both.

First I/O logic 336 and second I/O logic 338 store the cells in memory system 340. The location of each cell is stored in the notification. In one implementation, instead of storing addresses in the notification, only the address of the first cell is stored in the notification, and the remaining cell locations are identified in the notification by offsets from the first address. After storing the cells for a packet in memory system 340, first I/O logic 336 and second I/O logic 338 send the notification, which includes a key, to R unit 342. While first I/O logic 336 and second I/O logic 338 are shown as separate units, they may be implemented as a single unit in other implementations consistent with the principles of the invention.

R unit 342 may include processing logic that provides packet administrative processing, such as route lookup, encapsulation lookup, accounting, and policing functionality. R unit 342 may receive one or more forwarding tables from RE 102 (FIG. 1) and use the forwarding table(s) to perform route lookups. R unit 342 may insert the lookup result into a notification received from first I/O logic 336 or second I/O logic 338, which it may store in memory system 340.

Memory system 340 may temporarily store cells from first I/O logic 336 and second I/O logic 338 and notifications from R unit 342. More particularly, as shown in FIG. 3, memory system 340 may include a plurality of buffers 350-351, an arbitration unit 360, and DRAM (dynamic random access memory) 370. Buffers 350 and 351 may be first-in-first-out (FIFO) notification buffers that temporarily store notifications received from first I/O logic 336, second I/O logic 338, and R unit 342. Arbitration unit 360 may be a round robin arbiter (RRA) constructed in a manner consistent with the principles of the invention. The RRA controls the transfer of notifications from buffers 350-351 to DRAM 370 by arbitrating among buffers 350-351 in a round robin fashion.

Arbiter 360

The operation and implementation of RRA 360 in arbitrating among notification buffers will now be described in detail with reference to FIGS. 4-6.

Figure 4:
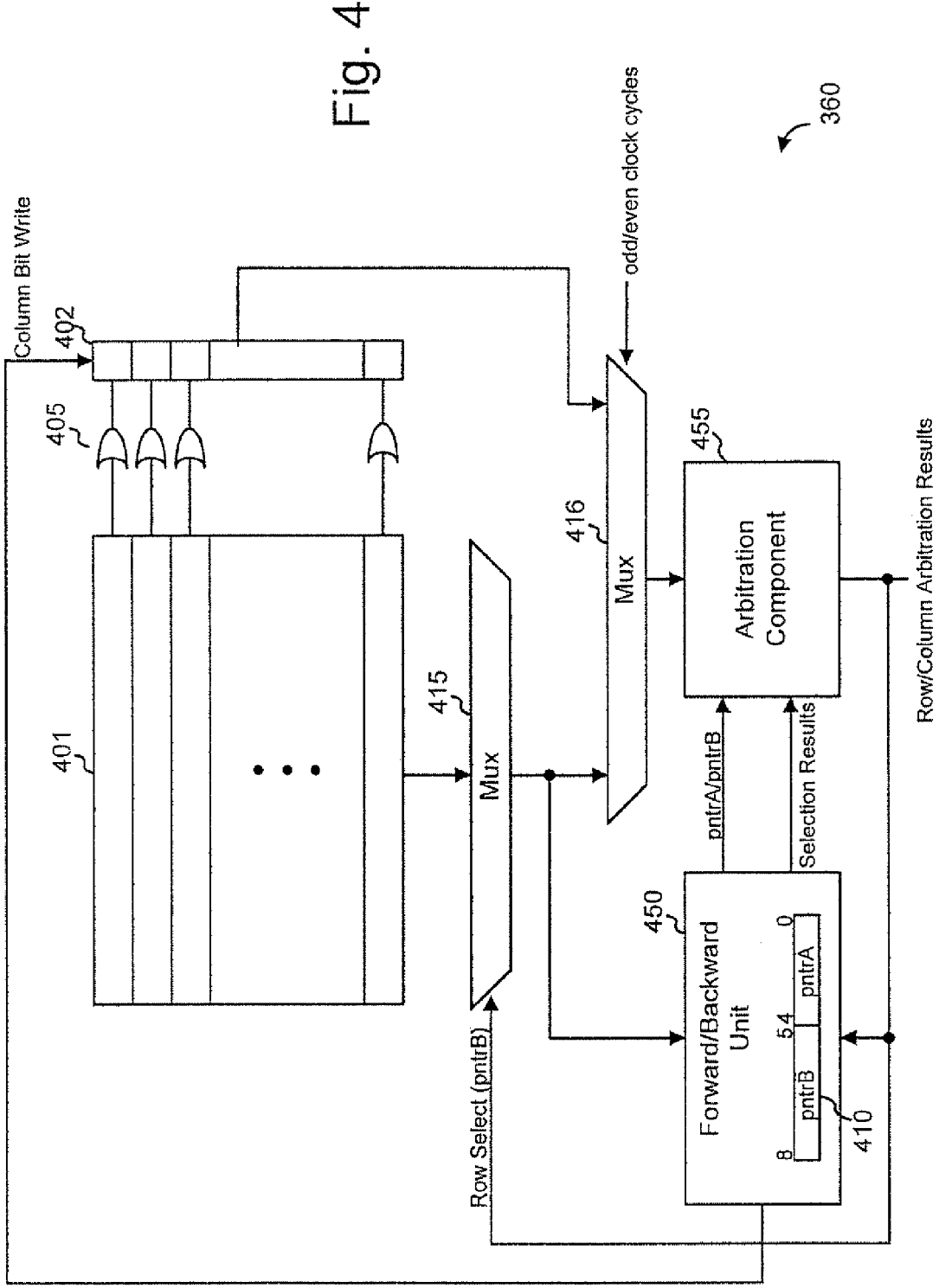
FIG. 4 is a diagram illustrating an exemplary implementation of a round robin arbiter consistent with the principles of the invention.

FIG. 4 is block diagram illustrating an implementation of RRA 360, in which the arbiter arbitrates among 512 requesters, such as 512 buffers 350-351.

RRA 360 includes a first set of arbitration vector registers 401, referred to as row arbitration vectors herein, and a column arbitration vector register 402, referred to as a column arbitration vector 402. Each of row arbitration vectors 401 may be a 32 bit vector. Arbitration vectors 401 are arranged as an array of 16 vectors, yielding 512 total bits (16×32) which are respectively associated with each of the 512 requesters. When a particular requester has data to be serviced, such as when one of buffers 350-351 contains a notification, the requester sets its corresponding bit in arbitration vectors 401.

Column arbitration vector 402 includes one bit for each of arbitration vectors 401. Thus, if there are 16 row arbitration vectors 401, column arbitration vector 402 is a 16 bit vector. In this manner, column arbitration vector 402 acts as an aggregation of all of the row arbitration vectors 401. Column arbitration vector 402, as well as row arbitration vectors 401, may be implemented as physical registers in random access memory.

Logical OR circuits 405 set the bit values in column arbitration vector 402. Specifically, for each of row arbitration vectors 401, one of logical OR circuits 405 performs a bitwise logical OR operation on the bits of that row arbitration vector. As a result, the bit in column arbitration vector 402 corresponding to a particular row in the row arbitration vectors is set if any of the bits in that row of the row arbitration vector are set.

RRA 360 additionally includes first and second multiplexers 415 and 416, respectively, a forward/backward logic unit 450, and an arbitration component 455. Forward/backward logic unit 450 contains a pointer register 410.

RRA 360 uses the value in pointer register 410 to index the row and column arbitration vectors 401 and 402. Pointer register 410 may be, for example, a nine bit register, and may be implemented as a nine bit counter. Conceptually, the nine bit pointer can be thought of as two separate pointers, labeled in FIG. 4 as pntrA and pntrB. PntrA, comprising the lower five bits of pointer 410 (i.e., bits 0-4), may reference values in the row arbitration vectors 401, while pntrB, comprising the upper four bits of pointer 410 (i.e., bits 5-8), references the values in column arbitration vector 402. In an alternate implementation, pntrA and pntrB could each be implemented as separate components.

First multiplexer 415 selects one of row arbitration vectors 401 based on the value of pntrB (received from arbitration component 455), and forwards the selected vector to forward/backward logic unit 450 and second multiplexer 416. Second multiplexer 416 alternates between selecting its input row arbitration vector 401 and column arbitration vector 402. The selected vector is forwarded to arbitration component 455. In one implementation, second multiplexer 416 sequentially alternates its selected input (e.g., it selects the row arbitration vector on odd clock cycles and the column arbitration vector on even clock cycles). In this manner, arbitration component 455 can perform both row and column arbitration.

Arbitration component 455 selects the next active bit in the column or row arbitration vector output from multiplexer 416 based on pntrA and pntrB. Thus, in the case of a row arbitration, arbitration component 455 selects the next active bit in the selected row arbitration vector after the value specified in pntrA. The requester corresponding to this bit will be the next requester to service. Similarly, in the case of a column arbitration, arbitration component 455 selects the next active bit in the column arbitration vector after the value specified in pntrB.

In general, forward/backward logic unit 450 updates the values in pntrA, pntrB, and may update the bits in column arbitration vector 402. FIG. 5 is a schematic diagram illustrating an exemplary implementation of forward/backward logic unit 450 consistent with principles of the invention.

Figure 5:
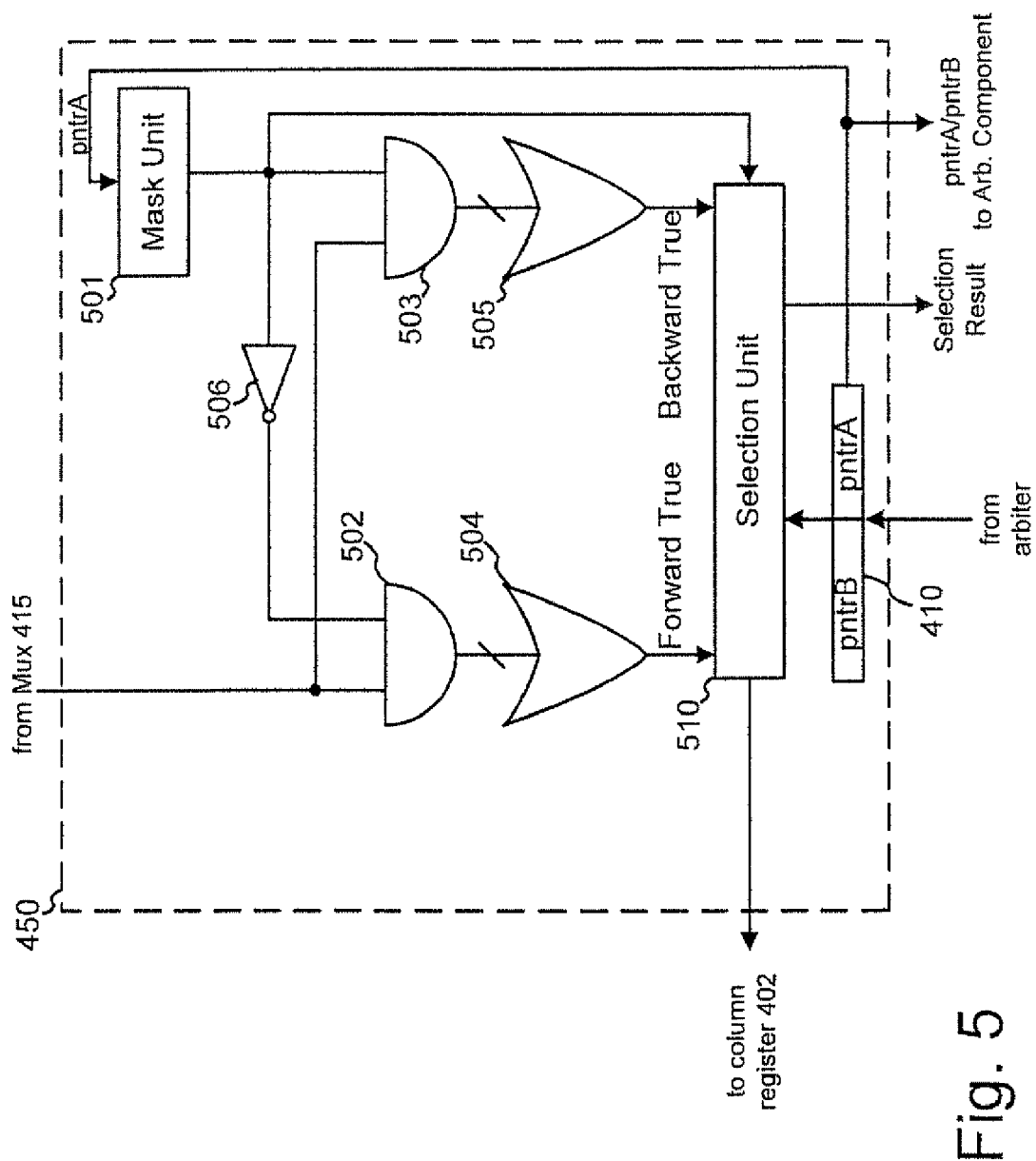
FIG. 5 is a schematic diagram illustrating an exemplary implementation of arbitration logic consistent with principles of the invention.

Referring to FIG. 5, arbitration logic 450 includes masking unit 501, bit-wise logic AND circuit 502, bit-wise logic AND circuit 503, logic OR circuit 504, logic OR circuit 505, and an inverter circuit 506. Logic OR circuits 504 and 505 logically combine a plurality of input bits, such as 32. Selection logic 510 receives the output signals from logic OR circuits 504 and 505, and based on the result, outputs a selection signal and the value of pntrA/pntrB to arbitration component 455.

Mask unit 501 receives pntrA from pointer register 410 and generates a vector comprising logic one values for all positions in the generated vector that are behind or equal to the value of pntrA. The generated vector is the same size as each of row arbitration vectors 401. Positions in the generated vector larger than the value in pntrA (i.e., positions that have not yet been processed by arbitration component 455) are thus set to a value of logic zero. Thus, for example, if the value in pntrA is ten, mask unit 501 may generate a 32 bit vector in which bits zero through ten are set to logic one and bits eleven through 31 are set to logic zero.

The row arbitration vector selected by multiplexer 415 and an inverted version of the vector from mask unit 501 are logically ANDed on a bit-by-bit basis by AND circuit 502. Thus, when a 32-bit value is used in row arbitration vectors 401, a 32-bit result value is produced. Each of the 32 result bits are then ORed with one another by logic OR circuit 504 to produce the output signal labeled "forward true." Logic AND circuit 503 and logic OR circuit 505 function similarly to logic AND circuit 502 and logic OR circuit 504, except that the input to AND logic 503 is not inverted by inverter 506. The signal output by OR logic 505 is labeled "backward true."

Selection unit 510 updates the column arbitration vector 402 based on the backward true signal. Selection unit 510 additionally transmits the forward true signal to arbitration component 455. Based on these results, arbitration component 455 and forward/backward unit 450 operate to select the next requester in the round robin arbitration scheme.

Figure 6A:
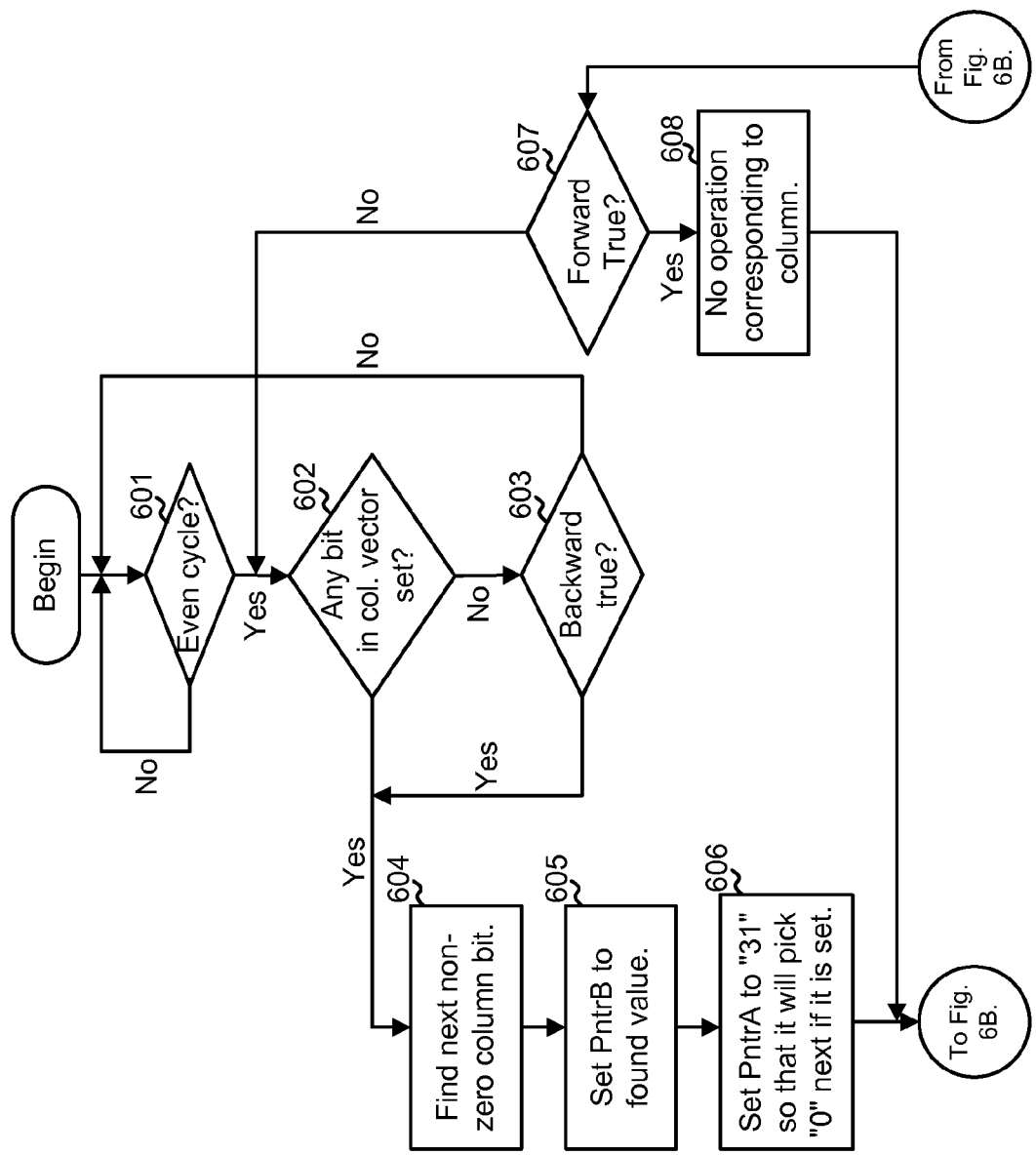
FIGS. 6A and 6B are flow charts illustrating exemplary processing consistent with principles of the invention by the arbitration logic shown in FIG. 5.
Figure 6B:
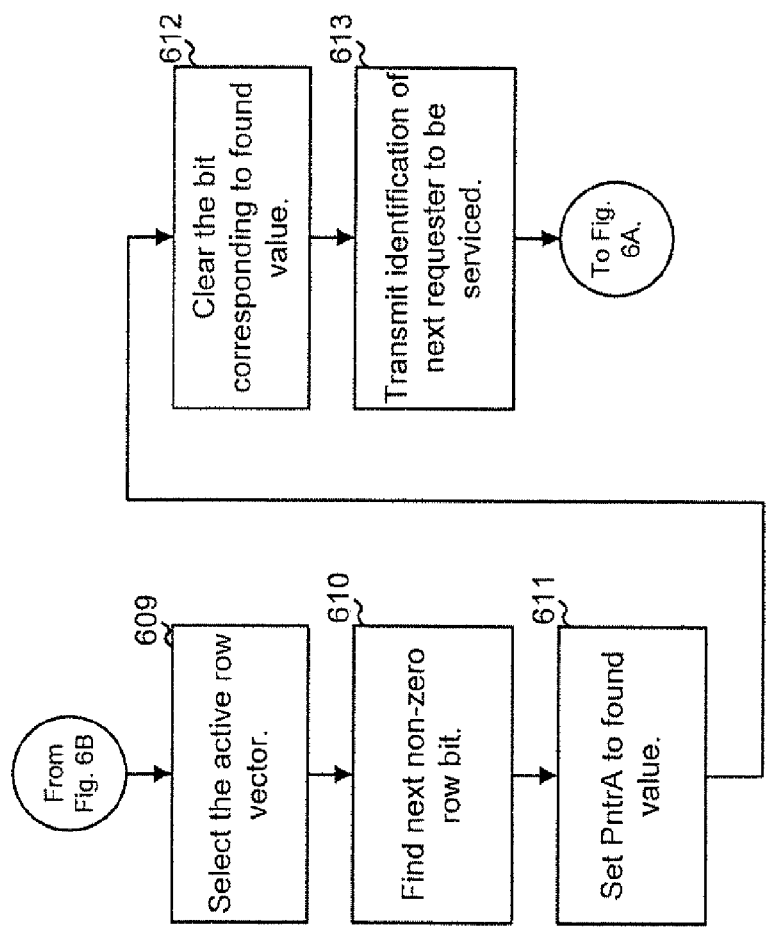

FIGS. 6A and 6B are flow charts illustrating exemplary processing consistent with principles of the invention by the logic shown in FIGS. 4 and 5. The processing shown in FIG. 6 assumes that row arbitrations are performed on odd cycles, column arbitrations are performed on even cycles, each row is 32 bits wide (numbered as rows zero through 32), and each column is 16 bits wide.

For a particular column and row arbitration cycle, RRA 360 begins column arbitration on an even clock cycle (Act 601). On the even clock cycle, RRA 360 determines if any bit in column arbitration vector 402 is set (Act 602). If a bit is set, then the next set bit (i.e., the next non-zero bit) in column arbitration vector 402 is found based on the value of PntrB, and PntrB is set to the found value (Acts 604 and 605). PntrA is set to its last value (i.e., "31") so that the next increment of PntrA will wrap PntrA around to its first value (i.e., "0") (Act 606). At this point, PntrB points to the active row arbitration vector 401. During the next (odd) clock cycle, the next bit in the row arbitration vector will be set (see FIG. 6B).

During the odd clock cycle, multiplexers 415 and 416 select the active row vector pointed to by PntrB (Act 609). Arbitration component 455 may then find the next non-zero bit in the active row using the value contained in PntrA as the starting value (Act 610). PntrA is set to the found value (Act 611). Arbitration component 455 may then clear the bit in row arbitration vector 401 corresponding to the found value, (Act 612), and output the row/column arbitration results (Act 613). The row/column arbitration results may include the pair of (PntrA, PntrB) values that identifies the next requester to be serviced.

Returning to FIG. 6A, after outputting the row/column arbitration results, RRA 360 may begin to process, at the next clock cycle, the next requester. RRA 360 may do this by initially determining if the forward true signal is a logic one (Act 607). If it is, there are additional bits set in row arbitration vector 401. Accordingly, no new column operation is performed (Act 608) before proceeding to the odd cycle operation (i.e., Acts 609-613, FIG. 6B). If however, the forward true signal is a logic zero, processing proceeds back to Act 602. If at Act 602, there are no column vectors set, RRA 360 determines if the backward true signal is a logic one (Act 603). If not, operation proceeds to Act 601. If so, operation proceeds to Act 604.

As described above, a hierarchical round robin arbiter includes a first set of arbitration vectors, each associated with a plurality of requesters. A second arbitration vector includes one bit for each arbitration vector in the first set. The single bit informs the round robin arbiter if any of the requesters associated with the corresponding arbitration vector in the first set are requesting service. When none of the requesters associated with an arbitration vector are requesting service, the round robin arbiter can determine that no requests are pending merely by examining the single bit in the second arbitration vector.

Although described in the context of a purpose-built router, concepts consistent with the present invention can be implemented in any system that uses a round robin arbiter. Additionally, although the exemplary implementation arbitrates between 512 possible requesters and the row vectors were divided into 32-bit row vectors, one of ordinary skill in the art will recognize that a round robin arbiter consistent with the principles of the present invention could be implemented with any number of possible requesters and with different numbers and sizes of row vectors. Moreover, the two-dimensional hierarchy of the round robin arbiter described above could be extended to more than two dimensions.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. An arbitrator comprising:
    an array of arbitration vectors, each arbitration vector including a group of first bits, each first bit corresponding to request information for each of a number of devices, where each first bit indicates that the request information is pending or that the request information is not pending;
    an aggregate arbitration vector including a plurality of second bits, each second bit corresponding to one of the arbitration vectors;
    a circuit associated with each arbitration vector-second bit pair to set values for the second bits when a first bit in the arbitration vectors of the arbitration vector-second bit pair indicates that request information is pending for the corresponding device;
    a pointer register to store pointers that reference the set values for the second bits; and
    an arbitration component to arbitrate services among the number of devices based on the set values in the aggregate arbitration vector as referenced by a corresponding one of the stored pointers.

2. The arbitrator of claim 1, at least one of the arbitration vectors or the aggregate arbitration vector comprising a physical register in random access memory.

3. The arbitrator of claim 1, the circuit comprising a logical OR circuit.

4. The arbitrator of claim 3, where when setting values, the circuit is to:
    perform a bit-wise logical OR operation on the first bit associated with the arbitration vector-second bit pair.

5. The arbitrator of claim 1, where the arbitration component determines, without examining the first bits, whether there are pending requests for service.

6. The arbitrator of claim 1, the array comprising row arbitration vectors and the aggregate arbitration vector comprising a column arbitration vector.

7. An arbitration system comprising:
   means for providing a plurality of bits in arbitration vectors of a multi-vector arrangement, where particular ones of the bits are set to indicate requests for service associated with a number of requesting devices;
   means for indexing the plurality of bits;
   means for aggregating the plurality of bits into a single bit for each of the arbitration vectors;
   means for indexing the single bits;
   means for determining, using the indexed single bits, that a request for service is pending for a particular one of the requesting devices;
   means for determining, using the indexed plurality of bits, an identity of the particular requesting device; and
   means for selecting, as part of an arbitration scheme, the particular requesting device for servicing based on the identity.

8. A method performed by one or more devices, comprising:
   examining, by the one or more devices, individual elements in a first arbitration vector, each of the individual elements corresponding to a plurality of elements in a second arbitration vector of a set of second arbitration vectors, to identify an active second arbitration vector of the set of second arbitration vectors, where the active second arbitration vector includes at least one element indicative of a service request associated with the active second arbitration vector;
      when the active second arbitration vector is identified, examining, by the one or more devices, at least some of the plurality of elements in the active second arbitration vector to identify the at least one element indicative of the service request associated with the active second arbitration vector,
      outputting, by the one or more devices, a result of the examining of the at least some of the plurality of elements in the active second arbitration vector, where the result identifies the service request associated with the active second arbitration vector, and
      when the at least some of the plurality of elements comprises fewer than all of the plurality of elements in the active second arbitration vector, determining, by the one or more devices and based on an examination of each of the plurality of elements in the active second arbitration vector, that every service request associated with the active second arbitration vector has been identified;
   examining, by the one or more devices and upon a determination that every service request associated with the active second arbitration vector has been identified, other ones of the individual elements in the first arbitration vector to determine whether the set of second arbitration vectors includes any other active second arbitration vectors; and
   arbitrating, by the one or more devices and based on the identified service request, services among the second arbitration vectors of the set of second arbitration vectors.

9. The method of claim 8, further comprising:
   logically ORing each of the plurality of elements of one of the second arbitration vectors to form the one of the individual elements.

10. The method of claim 9, further comprising:
    determining whether the identified service request is pending based on a result of the logically ORing.

11. The method of claim 8, where the individual elements comprise individual bits, and the plurality of elements comprise a plurality of data bits, the method further comprising:
    performing a bit-wise logical OR operation on the plurality of data bits of one of the second arbitration vectors to form the individual bit of the first arbitration vector.

12. The method of claim 11, the performing the bit-wise logical OR operation comprising setting the individual bits.

13. The method of claim 11, further comprising:
    updating the individual bits for the arbitrating based on the performing the bit-wise logical OR operation.

14. The method of claim 11, further comprising:
    determining whether the identified service request is pending by examining the individual bits in the first arbitration vector.

15. The method of claim 11, where at least one of the plurality of second arbitration vectors or the first arbitration vector is implemented as a physical register in a random access memory.

16. The method of claim 8, further comprising:
    clearing the at least one element indicative of the identified service request from the active second arbitration vector.

17. The method of claim 8, further comprising:
    delaying processing the identified service request at a next clock cycle based on the arbitrating.

* * * * *